United States Patent
Wada

[11] Patent Number: 5,159,837
[45] Date of Patent: Nov. 3, 1992

[54] ULTRASONIC WAVE OBSTACLE SENSOR
[75] Inventor: Shunichi Wada, Himeji, Japan
[73] Assignee: Mitsubishi Denki K.K., Tokyo, Japan
[21] Appl. No.: 645,511
[22] Filed: Jan. 24, 1991
[30] Foreign Application Priority Data
  Feb. 1, 1990 [JP] Japan ................................. 2-20451
[51] Int. Cl.⁵ .......................... G01N 29/00; G08G 1/00
[52] U.S. Cl. ......................................... 73/602; 340/901
[58] Field of Search .................. 340/905, 904, 901; 367/909, 903, 908; 73/597, 602

[56] References Cited
U.S. PATENT DOCUMENTS
  4,551,722 11/1985 Tsuda et al. ..................... 340/904
  4,561,064 12/1985 Brüggen et al. .................. 340/904
  4,674,073 6/1987 Naruse ............................ 340/904

OTHER PUBLICATIONS
"A New Method of Object Recognition and Sensory Feedback Control by High Accuracy Ultrasonic Sensor", by Ken Sasaki et al., Journal of the Faculty of Engineering, Univ. of Tokyo, vol. 39, No. 3 (1988) pp. 209-240.

Primary Examiner—Louis Arana
Attorney, Agent, or Firm—Sughrue, Mion, Zinn Macpeak & Seas

[57] ABSTRACT

An ultrasonic wave type obstacle sensor which comprises a first ultrasonic microphone for transmitting intermittently ultrasonic waves to a road surface obliquely and forwardly at predetermined timing, a second ultrasonic microphone for receiving the ultrasonic waves reflected from the road surface side, a comparator for providing an obstacle detecting signal when a signal from the second ultrasonic microphone exceeds a predetermined level of judgement, and an obstacle discriminating device for generating an obstacle discriminating signal when the pulse width of the obstacle discriminating signal is a predetermined width or larger.

4 Claims, 5 Drawing Sheets

ULTRASONIC WAVE OBSTACLE SENSOR

BACKGROUND OF THE INVENTION

1. Field of the Invention

The present invention relates to a ultrasonic wave type obstacle sensor to sense a state of road surface in front of an automobile in advance to thereby send an input information to a suspension control device for the automobile so that a shock to the automobile body can be reduced. More particularly, the present invention relates to a ultrasonic wave obstacle sensor which avoids erroneous detection due to noises in a signal received, and which detects only an obstacle with high precision.

2. Discussion of Background

Heretofore, an obstacle sensor utilizing ultrasonic waves reflected from an obstacle has been applied to an automobile or the like. A sensor for detecting an obstacle around a car body is disclosed in, for instance, Japanese Examined Patent Publication No. 30436/1989. The sensor is adapted to generate pulsating ultrasonic waves around the car body so that judgment on the presence or absence of an obstacle is made depending on the ultrasonic waves reflected from a road surface.

A ultrasonic wave type obstacle sensor capable of sensing in advance a state of the road surface in front of the car body during cruising is disclosed in, for instance, Japanese Unexamined Patent Publication No. 31813/1987. In that publication, the sensor is used for a suspension control device for an automobile. In this case, ultrasonic waves are continuously generated obliquely and forwardly with respect to the direction of cruising of the automobile.

Generally, the distance between the sensor and an obstacle is calculated on the basis of a signal obtained by reflected waves when the obstacle is to be detected by using the ultrasonic waves. Various proposals have been made in order to measure correctly a wide range of distances which covers a short distance such as several centimeters and a long distance such as several meters.

In a proposal in the first publication, the following contrivance is made in order to avoid ultrasonic waves reflected from a normal road surface and which are recognized as an obstacle, when a state of road surface in front of or around the car body is sensed. Namely, the directivity of a microphone as a signal receiving device has to be improved. Ultrasonic waves are directed in a substantially horizontal direction so that reflected waves from the normal road surface are not recognized as an obstacle. In this case, however, it is difficult to detect precisely an obstacle because the reflected waves can not be sufficiently received.

In the second publication, reflected ultrasonic waves from a road surface are positively used. However, the following disadvantages are found because the ultrasonic waves are continuously directed to the road surface in front of the car body and the reflected waves are continuously monitored.

(1) A heat value from the ultrasonic wave generating device becomes large and it is difficult to increase the ultrasonic energy.

(2) It is difficult to sense correctly an obstacle because there are interferences between the ultrasonic waves transmitted and which are received, and influenced by standing waves.

(3) It is difficult to discriminate whether the received ultrasonic waves are reflected waves from the road surface at a specified area and in front of car body, or if reflected waves from the road surface are out of the specified area (either at a remote distance or a near distance).

(4) It is difficult to discriminate factors which change the intensity of the reflected waves other than an obstacle (a projection or a concave hole) on the road surface, the factors for changing the intensity of the reflected waves being, for instance, wind, uneven distribution of temperature and so on.

Further, since the conventional obstacle sensor can not discriminate the ultrasonic waves reflected from small stones having a negligible size or noises in ultrasonic waves from another automobile near the car body when the engine of the automobile is started, it is impossible to detect correctly only the obstacle.

SUMMARY OF THE INVENTION

It is an object of the present invention to provide a ultrasonic wave type obstacle sensor capable of discriminating effectively an obstacle on a road surface and in front of the automobile, eliminating erroneous detection caused by noises contained in the reflected ultrasonic waves and detecting with certainty only an obstacle.

The foregoing and other objects of the present invention have been attained by providing a ultrasonic wave type obstacle sensor which comprises a ultrasonic wave generating device for transmitting intermittently ultrasonic waves to a road surface obliquely and forwardly at a predetermined timing, a ultrasonic wave receiving device for receiving the ultrasonic waves reflected from the road surface side, a comparator for outputting an obstacle detecting signal when a signal from the ultrasonic receiving means exceeds a predetermined level of judgement, and an obstacle discriminating circuit for outputting an obstacle discriminating signal when the pulse width of the obstacle discriminating signal is a predetermined width or larger.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENT

Figure 1:
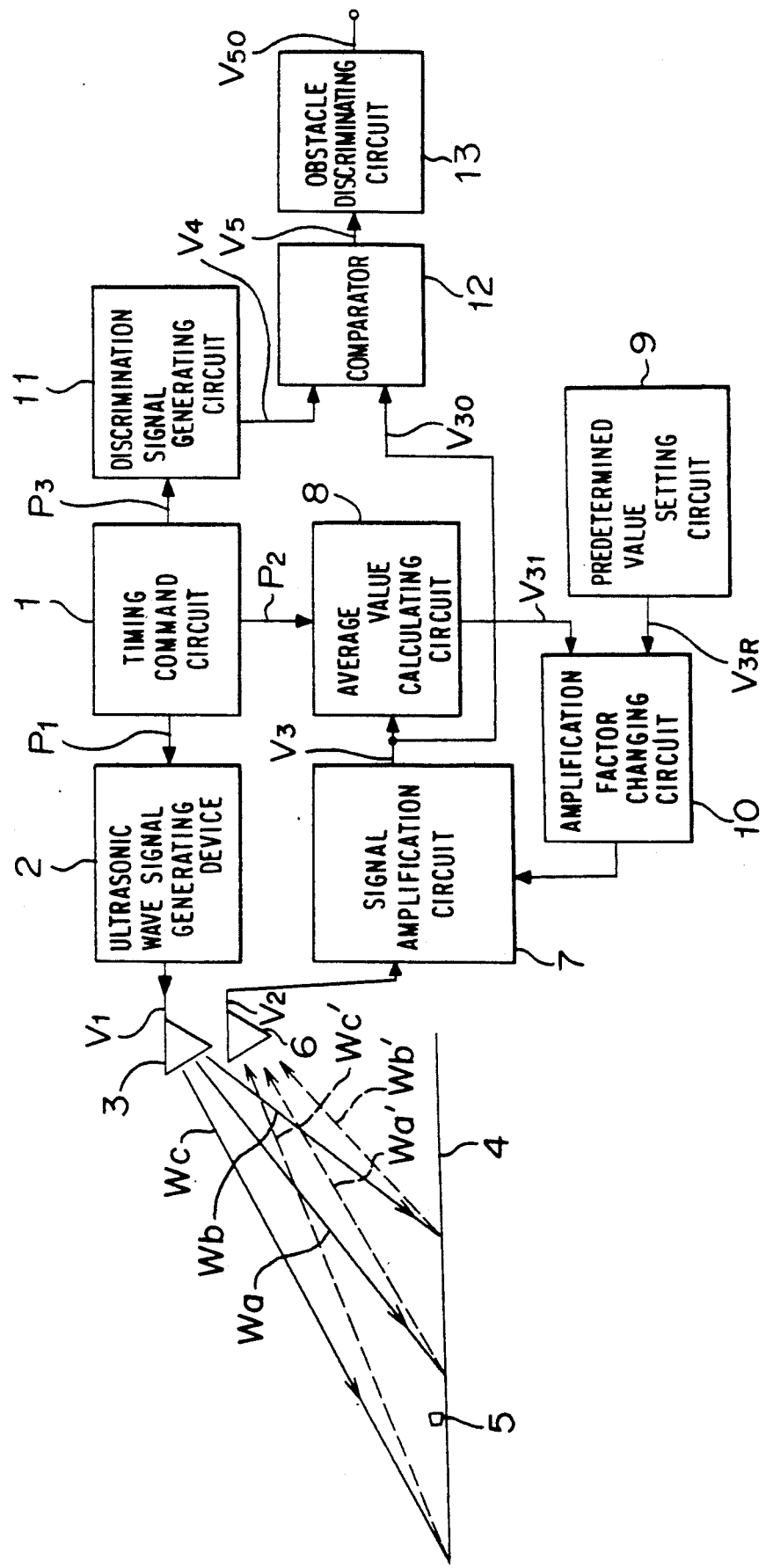
FIG. 1 is a block diagram showing the function and the construction of the ultrasonic wave type obstacle sensor according to an embodiment of the present invention.

Referring to the drawings wherein the same reference numerals designate the same or corresponding parts, in particular to FIG. 1 showing a block diagram for explaining the function and the construction of the ultrasonic wave type obstacle sensor according to an embodiment of the present invention, a timing command circuit 1 generates command signals for timing control P1–P3 at predetermined pulse intervals. An ultrasonic wave signal generating device 2 receives the command signal P1 of the timing command means 1 and produces a ultrasonic wave signal to be transmitted V1 having a predetermined time width, a voltage and a frequency, on the basis of the command signal P1.

An ultrasonic wave generating device 3 is actuated in accordance with the ultrasonic wave signal V1 to transmit ultrasonic waves Wa-Wc intermittently at a predetermined timing obliquely and forwardly toward a road surface 4. An ultrasonic wave receiving device 6 receives reflection ultrasonic waves Wa'-Wc' reflected from the road surface 4 and an obstacle 5 on it. The ultrasonic wave generating device 3 and the ultrasonic wave receiving device 6 are respectively constituted by ultrasonic microphones which are disposed near the bumper of the car body.

A signal amplification circuit 7 performs the amplification and AM detection of a signal V2 received from the ultrasonic wave receiving device 6 so that the level of the receiving signal can be easily treated. An average value calculating circuit 8 performs averaging of a signal V3 amplified at the signal amplification circuit 7 in accordance with the command signal P2 from the timing command circuit 1 and produces an average value signal (average level signal) V31. A predetermined value setting circuit 9 outputs a predetermined value $V_{3R}$ as a Standard for comparison, which is previously determined with respect to the amplification signal V3. The predetermined value $V_{3R}$ is so determined as to be a value corresponding to the reference level of a discrimination signal V4.

An amplification factor changing circuit 10 including a calculation and amplification circuit is to compare the average value V31 with the predetermined value $V_{3R}$ and adjusts the amplification factor of the signal amplification circuit 7 so that the average value V31 is in agreement with the predetermined value $V_{3R}$. The average value calculating circuit 8 and the amplification factor changing circuit 10 constitute a feedback loop for the signal amplification means 7, whereby the signal amplification means 7 outputs an amplification signal V30 stably.

A discrimination signal generating circuit 11 produces a discrimination signal V4 which provides a reference level for comparison to the amplification signal V30, in accordance with the command signal P3, i.e. a timing pulse signal. A comparator 12 which may be composed of a calculation/amplification circuit, compares the amplification signal V30 with the discrimination signal V4, and outputs an obstacle detection signal V5 when the level of the amplification signal V30 is over the predetermined discrimination level, i.e. the discrimination signal V4. An obstacle discriminating circuit 13 removes noise components from the obstacle detection signal V5 and outputs an obstacle discriminating signal V50 which is composed only of the obstacle detection signal V5 having a predetermined pulse width or larger.

The amplification factor changing circuit 10 includes a relative ratio adjusting means which maintains the relative ratio between the average value V31 and the discrimination signal V4 to be a predetermined value.

Figure 2:
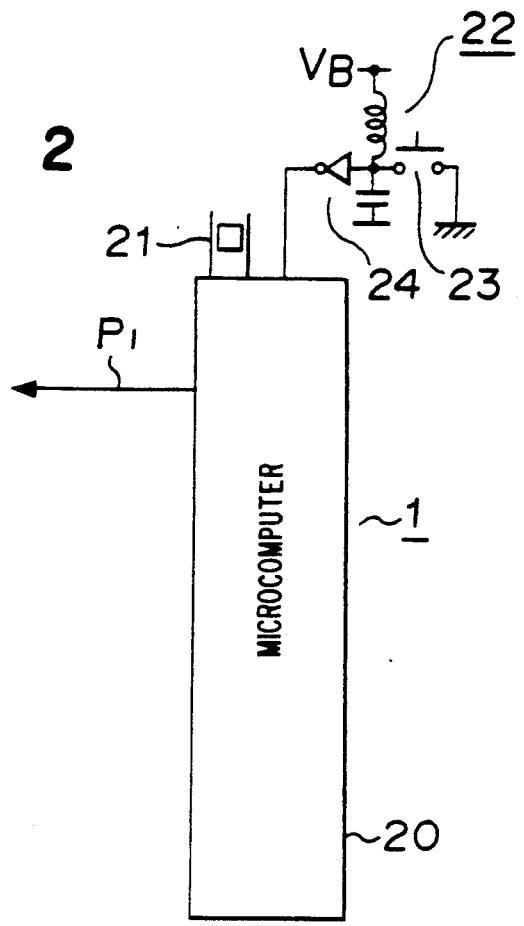
FIG. 2 is a diagram showing an embodiment of a timing command circuit as shown in FIG. 1.

FIG. 2 is a block diagram showing an embodiment of the timing command circuit 1.

The timing command circuit 1 is composed of a microcomputer 20 (for instance, HD63B01Y manufactured by HITACHI) in which a programmable timer (or a commercially available IC for a timer)is included. A crystal resonator 21 and a starting circuit 22 are connected to the microcomputer 20.

The starting circuit 22 comprises a self-returning type normally opening starting switch 23 disposed near the drivers seat of an automobile and a waveform shaping circuit 24 connected to the starting switch 23. The starting switch produces an "L" level signal when the switch is temporarily closed. The waveform shaping circuit 24 reverses and shapes the "L" level signal from the starting switch 23 to thereby output a starting signal.

The microcomputer 20 becomes operable by receiving a current from a d.c. power source and a constant voltage from a constant voltage circuit (not shown). The microcomputer 20 generates a series of clock signals in accordance with the oscillation of the crystal resonator 21; executes a program stored therein in response to each clock signal, and outputs a pulse-like command signal P1 (which triggers the other command signals P and P3).

Figure 3:
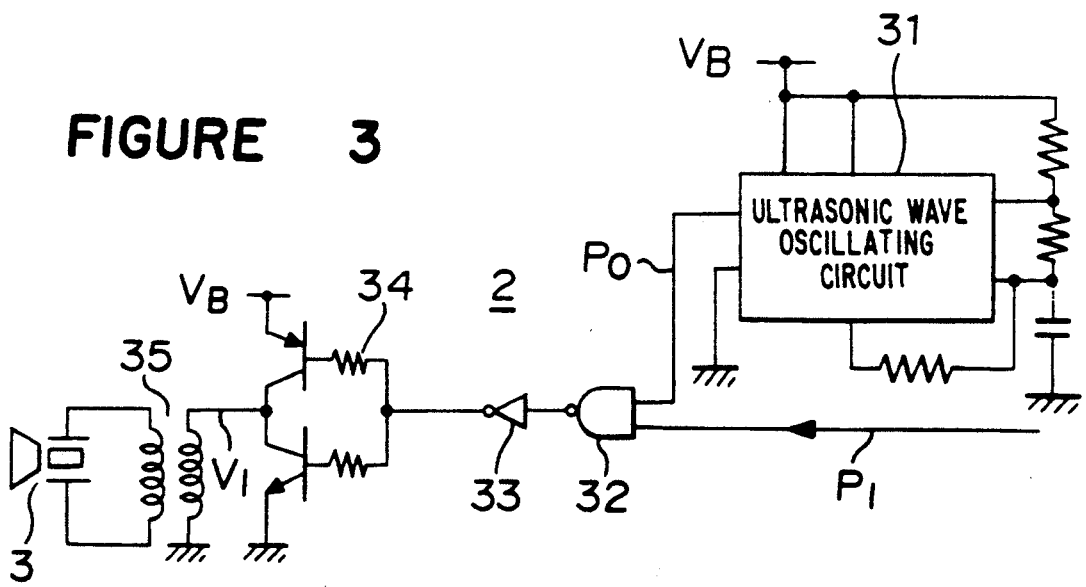
FIG. 3 is a diagram showing an embodiment of an ultrasonic wave signal generating device as shown in FIG. 1.

FIG. 3 is a diagram showing an embodiment of the ultrasonic wave signal generating device.

The ultrasonic wave signal generating device 2 comprises an ultrasonic wave oscillating circuit 31 for producing ultrasonic oscillation pulses Po having a high frequency, a NAND gate 32 to obtain the logical product of the ultrasonic oscillation pulses Po and the command signal P1, an inverter 33 for inverting the output of the NAND gate 32, an amplification circuit 34 for amplifying the ultrasonic pulses smitted as continuous pulses from the inverter 33, and a boosting transformer 53 which boosts the amplified ultrasonic wave signal V1 further and supplies the boosted ultrasonic wave signal V1 to the ultrasonic wave generating device 3.

Figure 4:
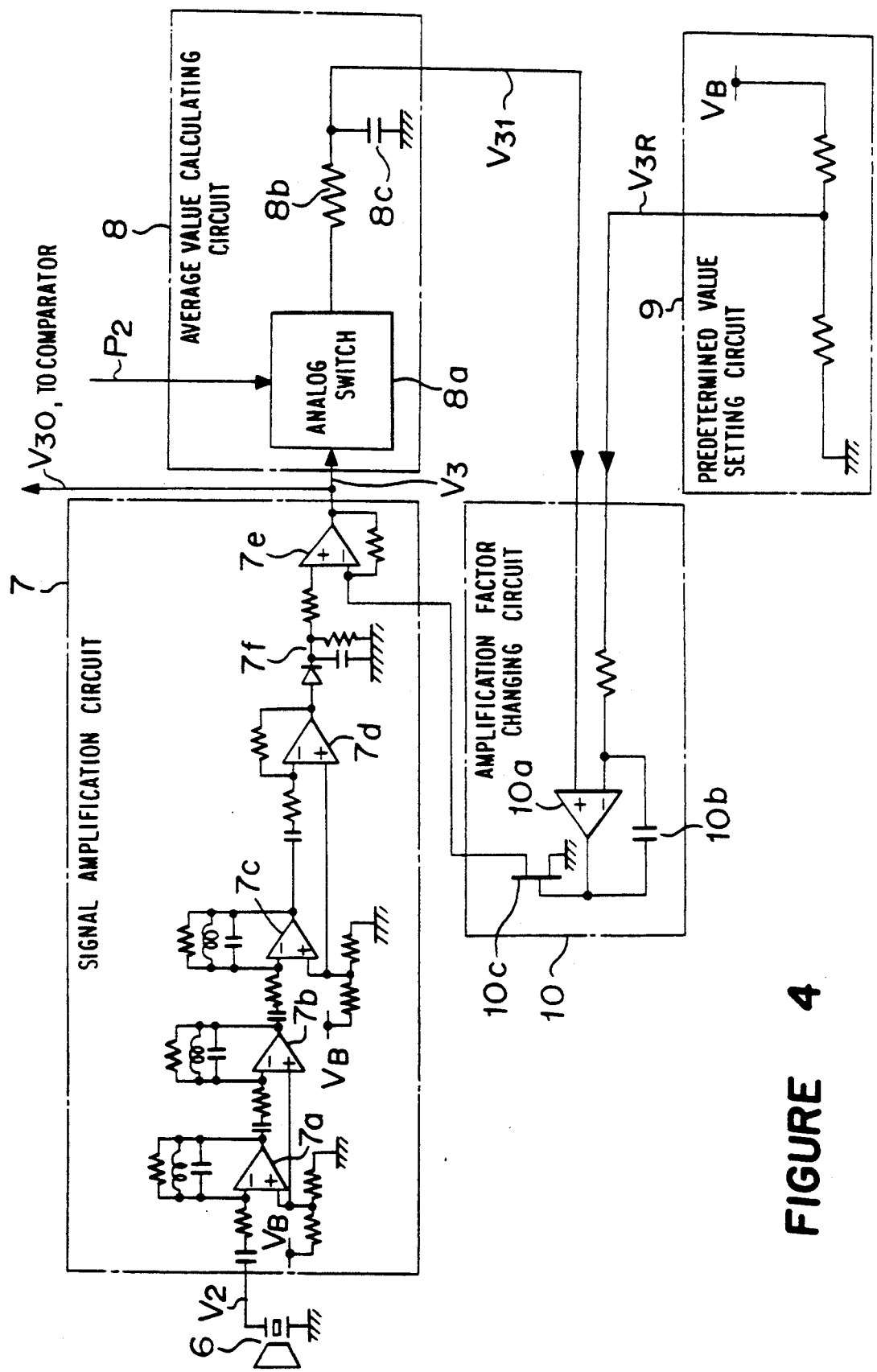
FIG. 4 is a block diagram showing embodiments of a received signal amplification circuit, an average value calculating circuit, a predetermined value setting circuit and an amplification factor changing means as shown in FIG. 1.

FIG. 4 is a block diagram showing in more detail the signal amplification circuit 7, the average value calculating means 8, the predetermined value setting circuit 9 and the amplification factor changing circuit 10.

The signal amplification circuit 7 for amplifying the signal V2 of the ultrasonic wave receiving device 6 comprises plural stages of amplifiers 7a–7e and an AM detector 7f connected in series wherein the amplifier 7e at the final stage is adapted to change its amplification factor.

The average value calculating circuit 8 for averaging the amplification signal 3 comprises a sampling analog switch 8a which is controlled by the command signal P2 which is used for extracting receiving waves and an averaging/holding circuit which is constituted by a resistor 8b and a capacitor 8c.

The predetermined value setting circuit 9 is constituted by a pair of serially connected resistors which divide the voltage $V_B$ of a power source so that a predetermined value $V_{3R}$ is output from the connecting point of the resistors.

The amplification factor changing circuit 10 is provided to adjust the amplification factor of the signal amplification means 7 on the basis of a result of comparison of the average value V31 and the predetermined value $V_{3R}$. The amplification factor changing circuit 10 comprises a calculation/amplification device 10a for comparing the average value V31 with the predetermined value $V_{3R}$, a capacitor 10b connected between the input and output terminals of the calculation/amplification device 10a and an FET 10c which is controlled on the basis of a result of comparison at the calculation/amplification device 10a. The output terminal of the FET 10c is connected to a control terminal (a negative terminal) of the amplifier 7e in the signal amplification circuit 7.

Figure 5:
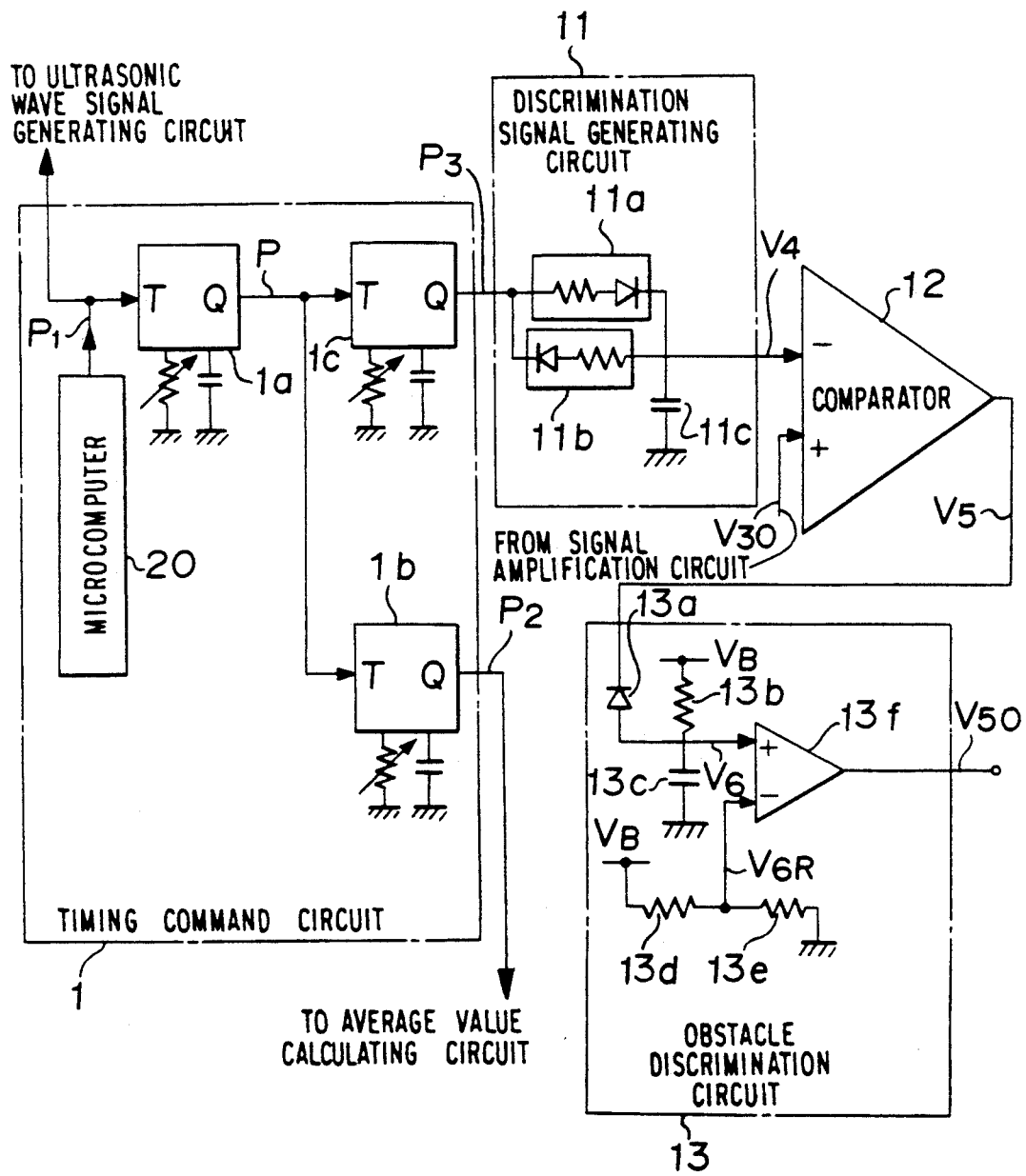
FIG. 5 is a block diagram showing embodiments of the timing command circuit, a judgment signal generating circuit and an obstacle discriminating circuit as shown in FIG. 1.

FIG. 5 is a block diagram showing in more detail the timing command circuit 1, the discrimination signal generating circuit 11 and the obstacle discriminating circuit 13.

The timing command circuit 1 includes the microcomputer 20, described above, which produces the command signal P1, and monostable multivibrators 1a-1c which are operable by the command signal P1 as a trigger pulse and are capable of controlling an output pulse time width. The first stage monostable multivibrator 1a outputs a pulse signal P in accordance with the command signal P1, and the second stage monostable multivibrators 1b and 1c respectively output command signals P2 and P3 in accordance with the pulse signal P.

The discrimination signal generating circuit 11 comprises a charging circuit 11a and a discharging circuit 11b each having a resistor and a diode wherein the diodes are in a relation of inverse parallel connection, and a capacitor 11c connected to the charging circuit and the discharging circuit 11b so as to be charged and discharged.

The charging circuit 11b and the capacitor 11c constitute a first discrimination signal generating circuit which produces an waveform of charging wherein the voltage linearly increases until a first predetermined time point when the command signal P3 is changed from an "L" level to an "H" level. The discharging circuit 11b and the capacitor 11c constitute a second discrimination signal generating circuit which produces an waveform of discharging in which the voltage linearly decreases until a second predetermined time point when the command signal p3 is changed from an "H" level to an "L" level.

The discrimination signal V4 outputted from an end of the capacitor 11c is input to a terminal (negative) of the comparing means 12, and the amplification signal V30 output from the signal amplification circuit 7 is inputted to the other terminal (positive) of the comparator 12.

The obstacle discriminating circuit 13 comprises a diode 13a having a cathode connected to the output terminal of the comparing circuit 12, a resistor 13b inserted between the anode of the diode 13a and the power source $V_B$, a capacitor 13c inserted between the anode of the diode 13a and the earth, a serial connection of resistors 13d and 13e for producing a signal $V_{5R}$ having a predetermined pulse width by dividing the voltage $V_B$ of the power source, and a comparator 13f for outputting the obstacle discrimination signal V50 by comparing a signal $V_{6R}$ having a predetermined pulse width with a signal V6 having a pulse width which appears at the connecting point between the resistor 13b and the capacitor 13c.

The resistor 13b and the capacitor 13c, which comprise a time constant circuit, constitutes a low pass filter in association with the diode 13a. The capacitor 13c is gradually charged with electricity from the power source $V_B$ when the obstacle detection signal V5 is in an "H" level, and is caused to discharge immediately through the diode 13a when the obstacle detection signal V5 is in an "L" level. The resistance value of each of the serially connected resistors 13d and 13e is previously determined so that they produce a signal $V_{6R}$ having a predetermined pulse width which is used as a reference for comparison in order to remove noise components contained in the obstacle detection signal V5.

Figure 6:
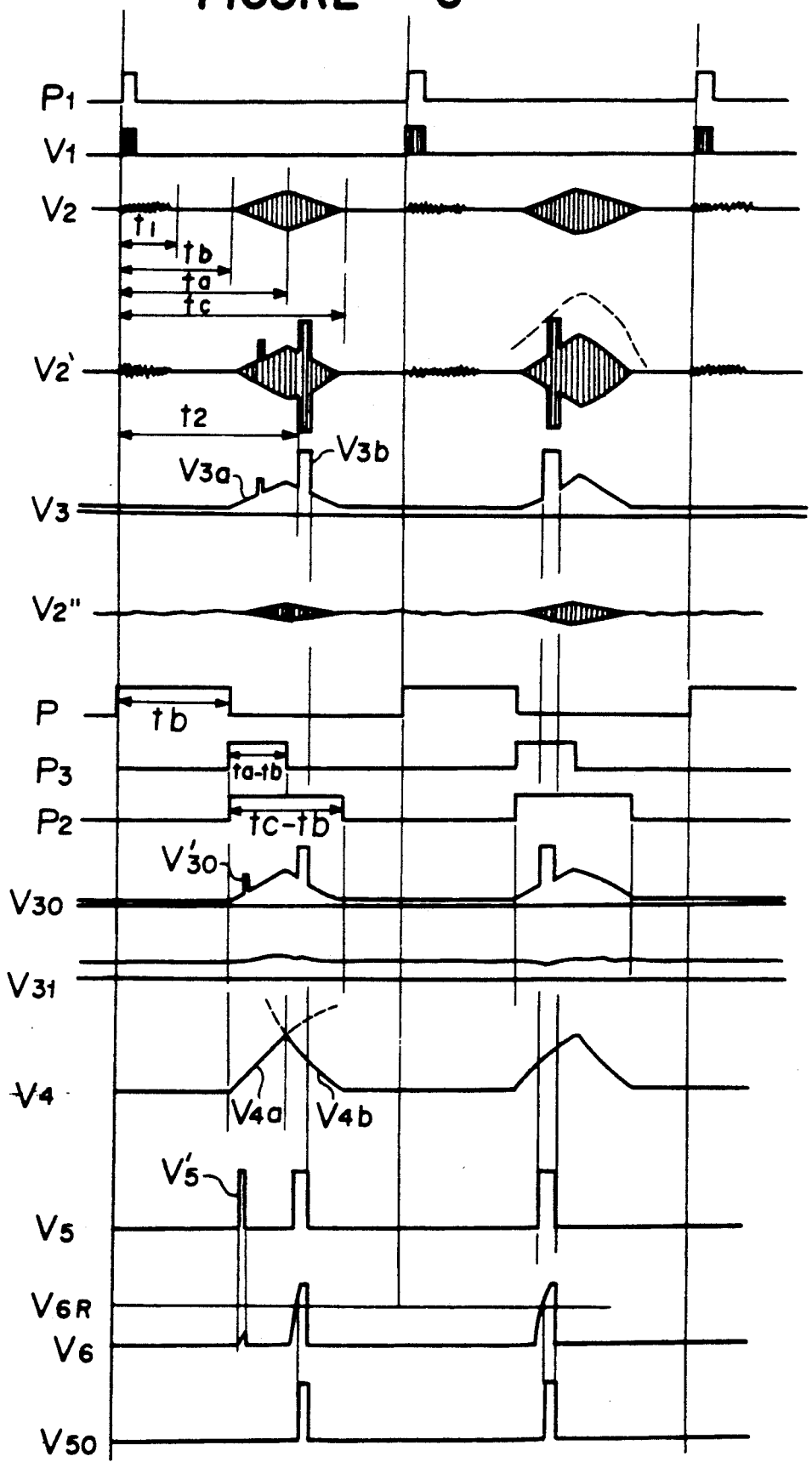
FIG. 6 is a diagram showing waveforms for explaining the operation of the ultrasonic wave type obstacle sensor according to the present invention.

The operation of the embodiment of the present invention as shown in FIGS. 1-5 will be described in detail with reference to a waveform diagram as in FIG. 6.

The timing command circuit 1 outputs timing control pulses, namely, the command signal P1 to the ultrasonic wave signal generating device 2. Then, the ultrasonic wave signal generating device 2 outputs the ultrasonic wave signal V1 to start ultrasonic wave transmission. The ultrasonic wave generating device 3, upon receiving the ultrasonic wave signal V1, directs the ultrasonic waves Wa-Wc toward a road surface 4 obliquely and forwardly. The ultrasonic waves hit the road surface 4 and are reflected therefrom. The reflecting waves Wa'-Wc' are received by the ultrasonic wave receiving device 6. When there is no obstacle 5 on the road surface 4, the received signal V2 forms a noise level during the time period from the time t=0 to the time t1. This noise level results from the direct wave of the ultrasonic waves Wa-Wc and needless reflecting wave components through bypass routes. When the time tb has passed from the time t=0, the reception of the signal of the ultrasonic wave reflected from the road surface commerces. In a case that the ultrasonic wave generating device 3 and the ultrasonic wave receiving device 6 are located close to each other, and they have the substantially same directivity, time tb corresponds to a time that the ultrasonic wave Wb (see FIG. 1) reciprocates the shortest path. Similarly, time ta corresponds to a reciprocal time for the ultrasonic wave Wa passing through the intermediate path and time tc corresponds to a reciprocal time for the ultrasonic wave Wc passing though the longest path. When each distance of the paths are respectively represented by la, lb and lc and the speed of sound is c, the following formulas are obtained:

$$ta = 2\ la/c$$

$$tb = 2\ lb/c$$

$$tc = 2\ lc/c$$

Due to the directivety of the ultrasonic wave generating device 3 and the ultrasonic wave receiving device 6, the intensity of the reflecting waves Wa'-Wc' from the road surface 4 assumes a substantially triangular waveform wherein the intensity begins to rise at the time point after the time period tb has lapsed; the intensity reaches its maximum value at the time point after the time period ta has lapsed, and it disappears at the time point after the time period tc has lapsed. The variations of the intensity depend on the directivity determined by the characteristics of the ultrasonic wave generating and receiving devices 3, 6 and a geometric arrangement of them, a state of the road surface 4, and the directivity of reflection of sonic waves. The waveform of the receiving signal V2 according to the reflecting waves Wa'-Wc' is repeatedly obtainable as indicated in the drawing each time when the ultrasonic waves Wa-Wc are directed in accordance with the generation of the ultrasonic wave signal V1.

On the other hand, when there is an obstacle 5 on the road surface 4, the intensity of the reflecting waves assumes a waveform wherein a reflecting wave component caused by the obstacle 5 is superimposed on the receiving signal V2 having a triangular shape in the same manner as the receiving signal V2'. In this case, a time period t2 in which the waveform produced by the obstacle 5 is observed, corresponds to a reciprocal time in the shortest path between the ultrasonic wave generating and receiving devices 3, 6 and the obstacle 5.

Assuming that the obstacle 5 stands still on the road surface 4 and an automobile having the ultrasonic wave type obstacle sensor approaches the obstacle 5, passing thereover and away from it, the ultrasonic wave Wc passing through the longest path hits the obstacle 5, and the obstacle 5 is sensed after the time period tc has passed. Accordingly, the obstacle sensing time period t2 is t2=tc. As the automobile runs (the detecting time period t2 changes to tc→ta→tb during the time ta through the time tb, and thereafter, the detection becomes impossible. This means that the automobile has passed over the obstacle 5 and away from it. Since the peak of the reflecting wave component caused by the obstacle 5 substantially corresponds to a value obtained by multiplying a reflecting wave intensity value at each time of detection indicated by t2 by a predetermined magnification, the shape of the peak assumes a triangular shape (cf, a broken line in FIG. 6) in the same manner as the receiving signal V2 by the reflecting wave from the road surface 4 without any obstacle.

The thus obtained receiving signal V2' is amplified and AM-detected by the signal amplification circuit 7 to become an amplification signal V3. In this case, by masking an unnecessary noise section (corresponding to the time period tc) at the time of the AM detection, a signal tb-tc is obtainable in the necessary section corresponding to the time period.

When there is the obstacle 5 on the road surface, a waveform component V3b caused by the obstacle 5 is superimposed on a waveform component V3a obtainable from the road surface 4 without the obstacle 5. Accordingly, the amplification signal V3 is expressed by $V3 \approx V3a + V3b$.

The level of each of the receiving signals V and V' is supposed to be a case where the condition of the road surface 4 is coarse because of use of asphalt. Therefore, in a case that the road surface 4 is of a smooth material such as concrete, the intensity level of the receiving signals can be small as a receiving signal V2', which can be observed even during a high speed cruising on the road surface of asphalt because the frequency of the reflecting waves Wa'-Wc' substantially changes due to the Doppler effect, and causes reduction of the signal level due to the characteristics of the ultrasonic wave receiving device 6. Thus, when the receiving signal V2'' having a low level appears, the reflecting wave component by the obstacle 5 also becomes small. Accordingly, it is impossible to discriminate the waveform component V3b caused by the obstacle 5 even though the amplification signal V3 itself is compared with a fixed level of discrimination. In order to eliminate this disadvantage, the circuitry is constructed in such a manner that the amplification factor of the signal amplification circuit 7 is feed-back-controlled in accordance with the level of receiving signal so that stable amplification signal V30 is produced.

Specifically, the timing command circuit 1 operates to obtain each time which corresponds to each of the times ta, tb and tc during the next cycle by using the command signal P1 as a tripper signal so that pulse signals for controlling, i.e. the command signals P2 and P3, are produced. Practically, the pulse signal P corresponding to the time tb is produced, and the command signal P3 corresponding to the time ta-tb and the command signal P2 corresponding to the time tc-tb are produced in accordance with the pulse signal P as shown in FIG. 6. Then, the average value calculating circuit 8 is actuated by the command signal P2 and the discriminating signal generating means 11 is actuated by the command signal P3.

Thus, when the pulse signals having predetermined time widths, namely, the command signals P2 and P3 are produced by the triggering of the command signal P1 produced by the programmable timer in the microcomputer 20, it is desired to use a monostable multivibrator circuit for the timing command circuit 1. In a case that only a programmable timer formed of the microcomputer 20 is used as the timing command circuit 1, the command signals P2 and P3 can be obtained through software in the same manner as the command signal P1.

The average value calculating circuit 8 calculates the average value of V31 of the amplification signal V3 in a time section extracted by the command signal P2 and maintains the thus obtained average value V31. Namely, as shown in FIG. 4, the analog switch 8a performs the sampling of the amplification signal V3 during only the time period tc-tb in which the command signal P2 is in an on state, the average-holding circuit constituted by the resistor 8b and the capacitor 8c produces the average value V31 of the amplification signal V3 with respect to time, and the average value V31 is input to amplification factor changing means 10.

The calculation/amplification device 10a in the amplification factor changing means 10 adjusts the amplification factor of the amplifier 7e by controlling the gate voltage of the FET 10b on the basis of a result of a comparison between the average value V31 and the predetermined value $V_{3R}$, whereby the amplification factor of the signal amplification circuit 7 is feed-back-controlled so that the average value V31 is finally in agreement with the predetermined value $V_{3R}$. Thus, the amplification factor changing circuit 10 increases the amplification factor of the signal amplification circuit 7 even when the level of the receiving signal V2 becomes low, e.g. as the receiving signal V2''. Accordingly, an amplified output having the same high level as the receiving signal V2 is obtained, and a stable amplification signal V30 can be always input to the comparator 12.

On the other hand, the discrimination signal generating circuit 11 is adapted to output a first discrimination signal V4a which linearly increases till the first predetermined time ta in response to a rising portion of the command signal P3 (at a time point when the time tb lapses), from the first discrimination signal generating circuit including the charging circuit 11a. Then, after the first discrimination signal V4a has become the greatest value at the falling portion of the command signal P3 (at the time when the time ta has passed), the second discrimination signal V4b which assumes the smallest value at the second predetermined time tc is output from the second discrimination signal generating circuit including the discharging circuit 11b. By the generation of the first and second discrimination signals V4a and V4b, the discrimination signal V4 shows a time function waveform having a triangle shape which corresponds to the amplification signal V30 and the discrimination signal V4 is input to the comparing means 12 as a reference waveform signal used for comparison. Naturally, the circuit constants of the charging circuit 11a, the discharging circuit 11b and the capacitor 11c and so on are previously determined to have optimum values in order to obtain the reference waveform.

Generally, when the sensor are arranged in a geometric fashion, the time function waveform (a triangular waveform) in the intensity of standard signals received from the road surface 4 can easily be estimated, and a stable waveform can be maintained. Namely, the inclination and the height of the discrimination signal 4 can be formed to have the same waveform of the standard signal reflected from the road surface 4 when the directivity of the ultrasonic wave generating means and the receiving devices 3, 6 and a geometric arrangement thereof are suitably selected. However, the magnitude of the discrimination signal V4 may vary due to certain causes. In view of the above-mentioned fact, therefore, the time function waveform of the discrimination signal V4 is determined so as to correspond to a previously estimated time function of the intensity of the standard signal from the road surface 4 and to have a level multiplied by a predetermined ratio.

The comparator 12 detects only the waveform component by the obstacle 5 by comparing the amplification signal V30 which is feed-back-controlled with the discrimination signal V4 and output the obstacle detection signal V5. By comparing both signals, since the comparator 12 compares the amplification signal V30 having a stable signal level with the discrimination signal V4, the obstacle detection signal V4 can be produced in a stable manner. Namely, the amplification factor of the signal amplification circuit 7 is automatically adjusted, and the ratio of the amplification signal V30 to the discrimination signal V4 is kept substantially constant. Accordingly, the ratio of the amplification signal V30 to the discrimination signal V4 can be kept substantially constant merely by having the time function waveform of the discrimination signal V4 correspond to the time function of the intensity of the standard signal from the road surface 4 and by having the level multiplied by the predetermined ratio.

In fact, however, there are many small projections on the road surface, which have to be ignored. These small projections caused noise components V30' having a high peak and short pulse width are contained in the amplification signal V30 owing to the reflection waves as shown FIG. 6. Accordingly, the obstacle detection signal V5 also contains noise components V5' having a small pulse width besides signals generated from substantial obstacles such as a step portion in the road surface. These noise components V5' result from reflection waves from the small stones which do no influence the cruising of the automobile and ultrasonic waves produced at the time of starting by another automobile. These noise components may cause erroneous detection at the comparator 12. In order to eliminate this disadvantage, the obstacle discriminating circuit 13 is provided to remove the noise components V5' having a predetermined pulse width or smaller, and outputs only an obstacle detection signal having a predetermined pulse width or larger as an obstacle discriminating signal V50.

The operation of removing unnecessary components by the obstacle discriminating circuit 13 will be described. When the obstacle detection signal V5 is changed to an "H" level, the capacitor 13c in the time constant circuit starts to be charged, whereby the level of the pulse width signal V6 is gradually increased. At the falling of a pulse of the obstacle detection signal V5 to become "L" level, the capacitor 13c is immediately discharged, and the level of the pulse width signal V6 is immediately changed to 0. Accordingly, the pulse width signal V6 has a level in the waveform which corresponds to the pulse width of the obstacle detection signal V5, and the noise component V5' having a small pulse width becomes a low level while the obstacle detection signal V5 having a large pulse width is at a high level, as shown in FIG. 6.

The comparator 13f compares the pulse width signal V6 with the predetermined pulse width signal $V_{6R}$ and outputs the pulse width signal V6 having a level higher than the predetermined pulse width signal $V_{6R}$, as the obstacle discrimination signal V50. As a result, needless noise components V5' are removed and only the obstacle detection signal V5 which corresponds to the reflection wave having a long sustaining time can be detected. Thus, the needed obstacle discrimination signal V50 can be obtained as an output pulse without impairing the sensitivity for detecting an obstacle.

In the above-mentioned embodiment, since the pulses of the ultrasonic wave are intermittently emitted obliquely and forwardly with respect to the car body so that the reflection waves Wa'-Wc' can be positively received, the presence or absence of the obstacle 5 can be effectively and rapidly discriminated and detected. In this case, ultrasonic wave noises having a small pulse width are superimposed on the regular reflection signals, the noise components V5' detected by the comparator 12 can be removed by the obstacle discriminating circuit 13, whereby only the obstacle 5 harmful to the automobile can be detected through the obstacle discrimination signal V50.

In the above-mentioned embodiment, even when the background level of the reflection waves varies due to the difference of car speed or the conditions of the road surface (smooth or rough), the amplification factor (the relative ratio of the average value to a critical level) can be adjusted on the basis of the average value V31. Accordingly, only the change of receiving signal V2 caused by the obstacle 5 can be discriminated with certainty irrespective of the periodical variations in level of the reflection waves Wa'-Wc' from the road surface 4 and nonsynchronous variations due to the surface conditions of the road surface 4 and variations in car speed. Further, since the discrimination signal V4 forming a level of comparison is of a triangular waveform which corresponds to variations with time of the receiving signal V2, it can optimally follow the level change in the triangular shape of the receiving signal V2 so that the optimum signal-to-noise (SN) ratio can be maintained in a predetermined time period tb-tc to thereby detect the obstacle 5.

As described before, the reflection waves reflected from the road surface, where there is no obstacle 5, assume a triangular waveform wherein they have a peak at the central portion of the length road surface which corresponds to the distance corresponding to the first predetermined time ta and the front and rear portions (a closer side and a remote side) with respect to the central portion (i.e. the peak). On the other hand, when there is the obstacle 5, the reflection wave component due to the obstacle 5 is superimposed on the reflection wave background level having a triangular shape. Accordingly, if there is no feedback loop for the signal amplification circuit 7, it is difficult to effect the matching of the amplification signal V30 and the discrimination signal (standard level for comparison) V4 when the reflection wave level is largely changed due to the surface condition of the road surface 4 and a change of car speed. The above-mentioned problem can be eliminated by adjusting the amplification factor so that the average value V31 of the amplification signal V30 which reflects a signal receiving level always takes the predetermined value $V_{3R}$; thus, the signal receiving level can be stabilized. In this case, the discrimination of signal levels with respect to the presence or absence of the obstacle can be executed in a stable manner even when the discrimination signal V4 is constant, and the reliability of detecting the obstacle 5 can be improved without a special limitation on the conditions.

In the above-mentioned embodiment, a case where the amplification factor is increased when the level of the amplification signal V3 decreases, is described. However, when the level of the amplification signal V3 is increased, the amplification factor of the signal amplification circuit 7 may be decreased by means of the amplification factor changing circuit 10. In this case, a stable amplification signal V30 can be obtained in the same manner as described in the above-mentioned embodiment.

Further, description has been made as to the adjustment of the level of the amplification signal V30 to the predetermined value $V_{3R}$ by using the amplification factor changing circuit 10 which is provided as a relative ratio adjusting means which renders the ratio of the average value to the level of determination to be constant. However, a feedback loop (not shown) for the average value V31 may be formed with respect to the discrimination signal generating circuit 11 so that the level of the discrimination signal V4 is changed depending on a change of the average value V31. Namely, the relative ratio can be adjusted by changing at least one of the average values (amplification signal) depending on a change of the average values (receiving signal) and the level of determination.

In the above-mentioned embodiment, the relative ratio adjusting means with the feeding-back average value is provided. However, such relative ratio adjusting means may not be provided in a case that it is not necessary to consider the level variation of the receiving signal V2. In this case, similarly, the noise components which cause erroneous detection can be removed.

Further, the timing command circuit 1 is constituted by the microcomputer 20 or the timer ICs 1a-1c separate from the microcomputer 20, and the discrimination signal generating means 11 is constituted by a separate circuit. However, these all circuits may be a single microcomputer, or these all circuits may be separate circuits (timer ICs).

Further, as the discrimination signal generating circuit 11, the analog type charging and discharging circuits 11a and 11b are used to form the discrimination signal V4 having a triangular waveform so as to follow the CR time constant. However, the same effect can be attained by using a digital circuit or a microcomputer so that the discrimination signal V4 having a waveform including stepwise increasing or decreasing portions.

Thus, in accordance with the present invention, a ultrasonic wave type obstacle sensor capable of eliminating erroneous detection and of discriminating effectively only reflection waves from an obstacle harmful to the automobile can be obtain by producing only an obstacle detection signal having a predetermined pulse width or larger to thereby remove noise components contained in the obstacle detection signal.

Obviously, numerous modifications and variations of the present invention are possible in light of the above teachings. It is therefore to be understood that within the scope of the appended claims, the invention may be practiced otherwise than as specifically described herein.

What is claimed is:

1. An ultrasonic wave type obstacle sensor which comprises:
    ultrasonic wave generating means for transmitting intermittently ultrasonic waves to a road surface obliquely and forwardly at a predetermined timing,
    ultrasonic wave receiving means for receiving the ultrasonic waves reflected from the road surface,
    comparing means for outputting an obstacle detecting signal when a signal from the ultrasonic wave receiving means exceeds a predetermined judgment level, and
    obstacle discriminating means for outputting an obstacle discriminating signal when the pulse width of the obstacle detecting signal is grater than or equal to a predetermined width.

2. The ultrasonic wave type obstacle sensor according to claim 1, which further comprises timing command means including a computing means, a timer and an oscillator, for providing a timing pulse signal to the ultrasonic wave generating means.

3. The ultrasonic wave type obstacle sensor according to claim 1, which further comprises means for providing a timing command operatively coupled to a means for generating a judgement signal which comprises a reference level signal (V4) used for comparison in said comparing means.

4. The ultrasonic wave type obstacle sensor according to claim 1, which further comprises signal amplification means for amplifying a signal corresponding to said ultrasonic waves reflected form the road surface, wherein the amplification of said signal amplification means is feedback controlled in response to means for changing an amplification factor operatively coupled to means for setting a predetermined value and serially coupled to said signal amplification means through means for calculating an average value, so as to produce an amplified signal (V30) which is compared with a reference level signal (V4) corresponding to said predetermined judgement level in said comparing means.

* * * * *